UNITED STATES PATENT OFFICE.

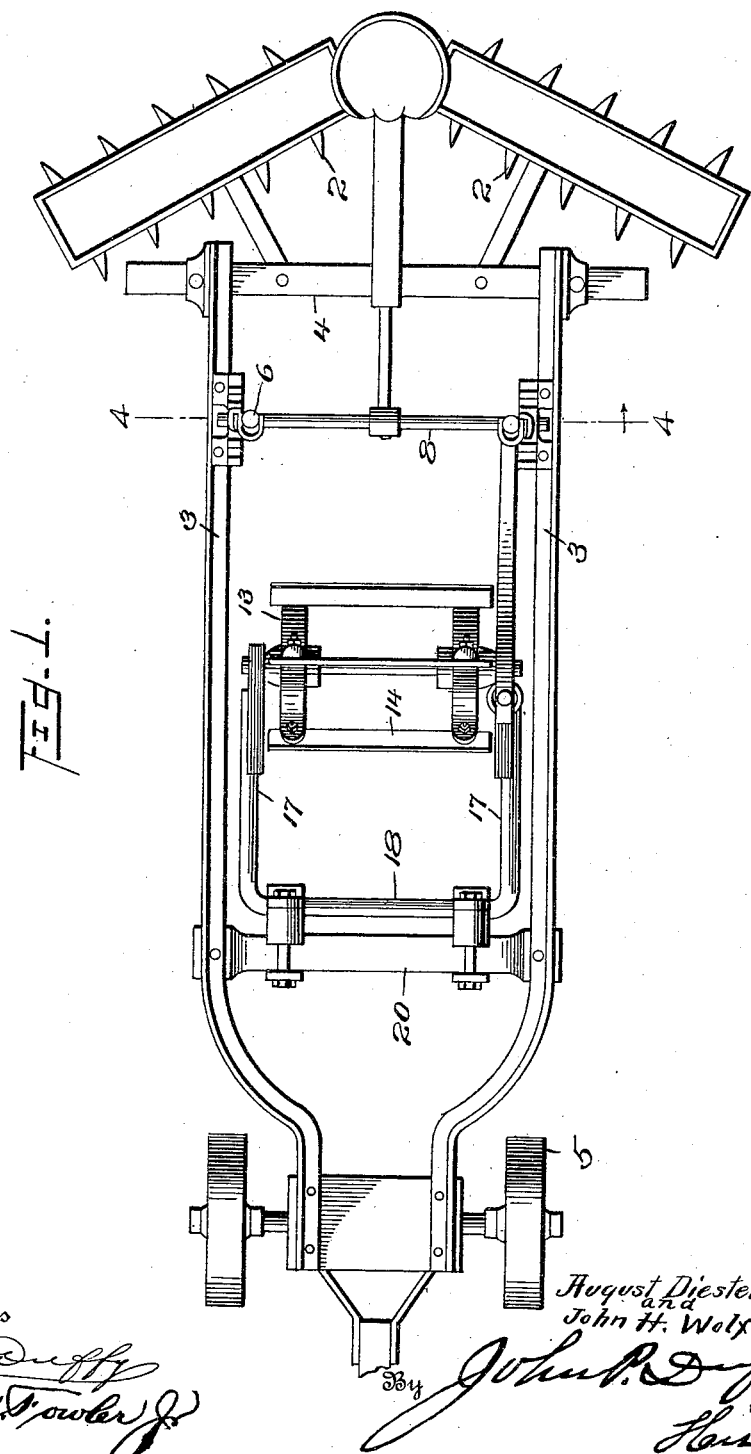

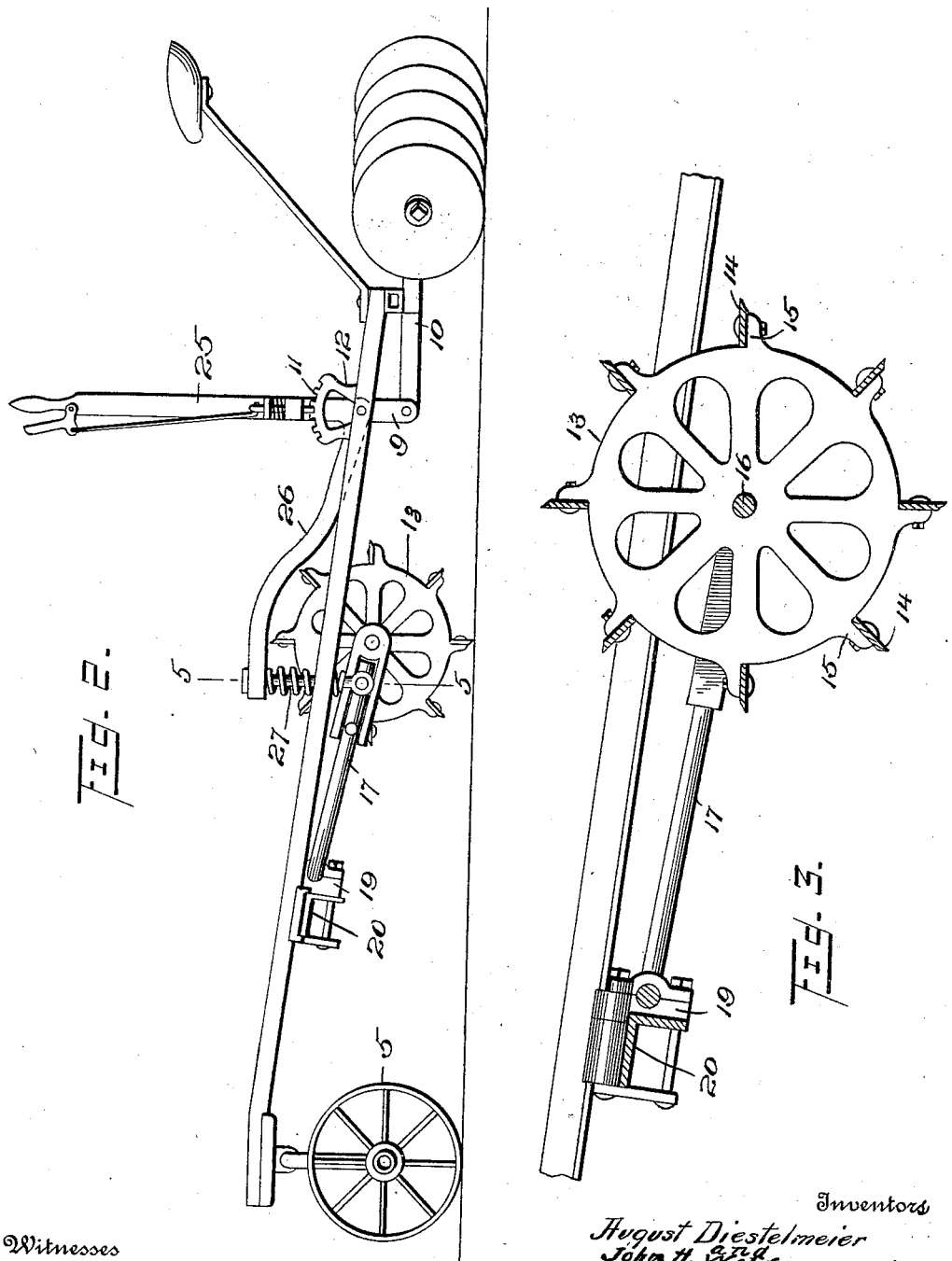

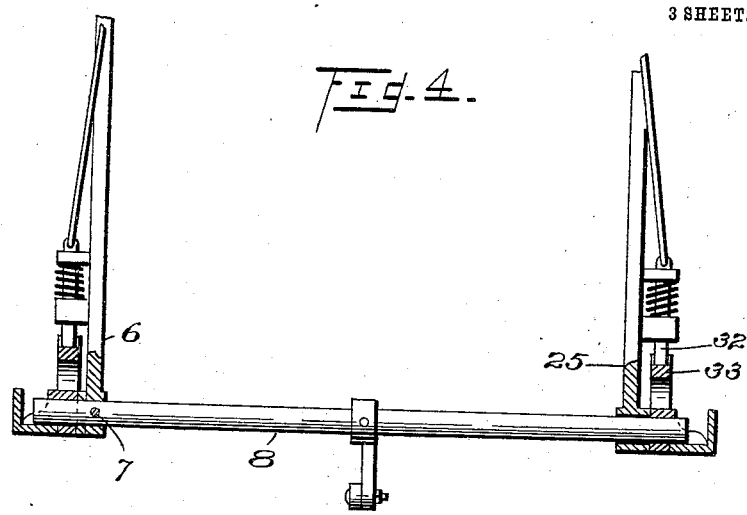
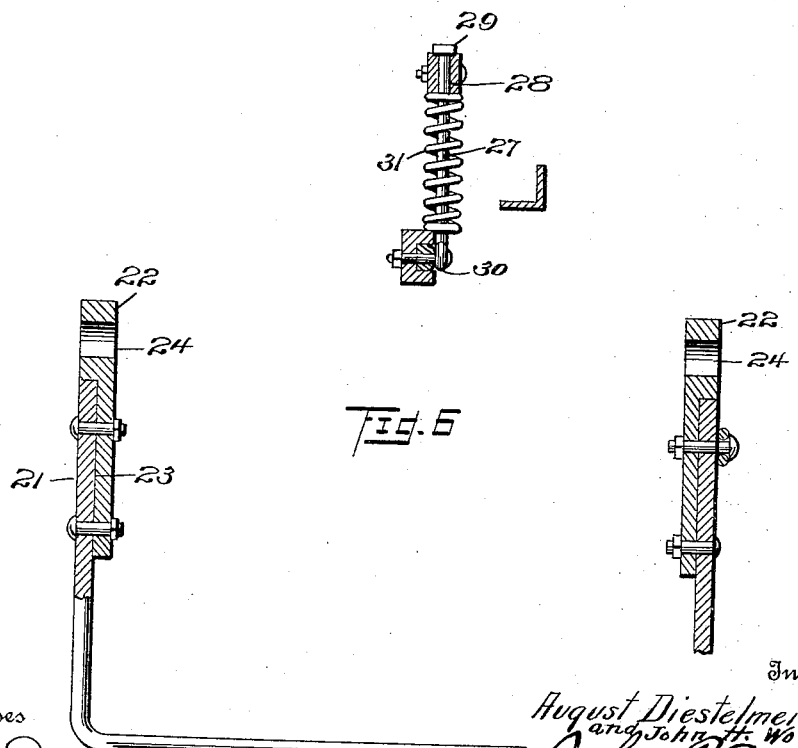
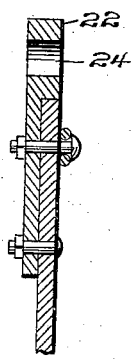

AUGUST DIESTELMEIER AND JOHN H. WOLF, OF LENA, ILLINOIS.

STALK-CUTTING ATTACHMENT FOR DISK CULTIVATORS.

1,005,697. Specification of Letters Patent. Patented Oct. 10, 1911.

Application filed June 27, 1910. Serial No. 569,257.

*To all whom it may concern:*

Be it known that we, AUGUST DIESTELMEIER and JOHN H. WOLF, citizens of the United States, residing at Lena, in the county of Stephenson and State of Illinois, have invented certain new and useful Improvements in Stalk-Cutting Attachments for Disk Cultivators, of which the following is a specification.

This invention relates to new and useful improvements in stalk cutting attachments for disk cultivators.

The primary object of this invention is to provide a device of this class which may be very readily and easily applied to a disk cultivator and which, when in operation, will cut the rows of stalks down and also cut the stalks up instead of tearing them out by the roots and scattering them over the field so that the stalks are cut up by the knives of the device, while such stalks as are thrown out of the path of the knives of the attachment are met by and cut up by the oncoming disks instead of left lying whole upon the ground.

With the foregoing and other objects in view, the invention consists in the novel features of construction, combination and arrangement of parts illustrated in the drawings and more particularly pointed out in the appended claim.

In the accompanying drawings, Figure 1 is a plan view of the attachment as applied to a disk cultivator. Fig. 2 is a side elevation of Fig. 1. Fig. 3 is a sectional view of the attachment on an enlarged scale. Fig. 4 is a transverse sectional view, taken on the line 4—4 of Fig. 1. Fig. 5 is a vertical transverse section, taken on the line 5—5 of Fig. 2. Fig. 6 is a horizontal sectional view (with parts broken away) of the blade and disk supporting frame.

Referring to the drawings for a more particular description of the invention and which are for illustrative purposes only and are therefore not drawn to scale, the cutting attachment, generally indicated by the numeral 1, is arranged in front of the center of a two section disk cultivator 2, by removing the tongue of the cultivator and connecting the frame 3 of the attachment to the cross bar 4 of the cultivator and mounting the front of the frame 3 on the trucks 5, to which the tongue is connected.

In attaching the device to the cultivator, the lever 6 of the disk is removed from its place in the center of the cultivator and mounted at the right hand side of the frame 3 of the attachment, as shown. In order that this lever may still be capable of performing its usual function, that of adjusting the disk gangs, it is rigidly connected by the pin 7 or other equivalent means with the right hand end of the transversely disposed rock shaft 8 mounted at opposite ends on the side pieces of the frame 3. The rock shaft 8 is provided at or near its center with the depending arm 9 which is connected, through the medium of the bar 10, with the disks. Thus it will be seen that by means of the lever 6 the operator may still adjust the disk gangs without interfering in the least with the operation of the cutting attachment.

The stalk cutting device, as shown, comprises in part, a pair of cast metal disks 13 carrying a series of transverse cutting knives or blades 14, which are bolted to radial lugs 15 extending from the peripheries of the wheels. The knife carrying disks are mounted for rotation on the axle 16 carried by the ends 17 of the vertically adjustable U shaped supporting frame 18, the cross piece of which is mounted to turn or rock in suitable bearing 19 bolted to the bearing bar 20 arranged at the front of the frame 3. It is to be observed that the ends of the frame 18 are made in two sections, namely, the outer sections 21 which are an integral part of the frame and the inner sections 22 which are bolted to the outer sections and are provided in their outer faces with recesses 23 to receive the same. The outer ends of the inner sections are provided with bearing apertures 24 which receive the ends of the axle 16 heretofore mentioned.

An operating bell-crank lever 25 is pivotally mounted on the left hand end of the shaft 8 with its right angularly disposed portion 26 extending forwardly and terminating at a point directly opposite or adjacent to one of the blade carrying wheels 13.

In carrying out the invention the front end of the arm 26 of lever 25 is connected, by means of the vertical eye bolt 27, with one of the side pieces of the U shaped supporting frame 18, as shown. The upper end of this bolt passes through an aperture 28 in the front of the arm 26 (or through a guide bearing plate that may be attached to said arm) and is headed, as at 29, the purpose of which is evident. The lower eyed end 30 of said bolt is bolted to one end of the blade carrying frame and a coil spring 31 is disposed around the bolt between the arm 26 and the frame.

In practice, the rotation of the wheels and cutting knives is accomplished by reason of the friction or contact between the knives and the ground. The weight of the wheels and knives keeps the latter on the ground at all times during the cutting operation while the spring 31 serves to compensate for any inequalities in the surface of the ground.

To raise the cutting blades 14 and wheels 13 clear of the ground the operator, after first releasing the spring actuated bolt 32 from the rack 33, pulls upon the handle of lever 25.

As pointed out in the introductory remarks the stalks are cut up by means of the knives of our attachment rather than torn out by the roots and left scattered over the field and as a consequence whatever stalks are thrown out of the path of the knives are met by the oncoming disks which cut them up to a comparatively fine state.

From the foregoing description taken in connection with the drawings it is thought that the construction and operation of the device will be readily understood without requiring a more extended explanation.

Various changes in the form, proportion and minor details of construction may be resorted to without departing from the principle or sacrificing any of the advantages of this invention as defined in the appended claim.

Having described our invention, what we claim as new is:—

In combination with a disk cultivator, a frame connected therewith, a stalk cutter mounted in the frame in front of the center of the disk gangs of the cultivator, a rock shaft mounted at the rear end of the frame, a disk adjusting lever fixedly mounted on one end of the rock shaft, a crank arm depending from the center of the shaft, a link between said arm and the disks of the cultivator, means for adjusting the stalk cutting attachment comprising a second lever loosely mounted on the opposite end of the rock shaft and operatively connected to said cutter, a pawl and rack device for holding the first mentioned lever and rock shaft in adjusted position and a second pawl and rack device for holding the second lever in adjusted position, independently of the rock shaft.

In testimony whereof we affix our signatures in presence of two witnesses.

AUGUST DIESTELMEIER.
JOHN H. WOLF.

Witnesses:
C. L. NELSON,
JOHN C. DUNN.

---

Copies of this patent may be obtained for five cents each, by addressing the "Commissioner of Patents. Washington, D. C."